June 3, 1969 G. T. F. CRESPIN ET AL 3,447,358
METHOD AND APPARATUS FOR MEASURING CLOUD POINT TEMPERATURES
Filed July 28, 1965

INVENTORS:
GEORGE T. F. CRESPIN
DONALD M. ROYCROFT
COLIN D. PRICE

BY:

THEIR ATTORNEY

INVENTORS:
GEORGE T. F. CRESPIN
DONALD M. ROYCROFT
COLIN D. PRICE
BY: *N. N. Kunitz*
THEIR ATTORNEY

United States Patent Office 3,447,358
Patented June 3, 1969

3,447,358
METHOD AND APPARATUS FOR MEASURING CLOUD POINT TEMPERATURES
George T. F. Crespin, Ellesmere Port, Donald M. Roycroft, Greatboughton, and Colin D. Price, Chester, England, assignors to Shell Oil Company, New York, N.Y., a corporation of Delaware
Filed July 28, 1965, Ser. No. 475,422
Claims priority, application Great Britain, July 28, 1964, 30,018/64
Int. Cl. G01n 25/02; G01k 17/00
U.S. Cl. 73—17                                   9 Claims

ABSTRACT OF THE DISCLOSURE

A technique for determining the cloud point temperature of oil having a sample vessel with a refrigeration unit surrounding it to reduce the temperature of the oil. The cloud point temperature is determined when the difference in temperature between two thermometers remotely spaced in the oil passes through zero.

---

The present invention is concerned with a method and apparatus for automatically determining the cloud point temperature, or at least a temperature correlated with the cloud point temperature, of liquids such as oils and in particular mineral oil. The apparatus according to the invention may produce an output signal representative of the cloud point temperature or of the said correlated temperature by means of which a process producing a product of which the cloud point is an interesting or an essential characteristic may be controlled.

Normally the cloud point of oils or similar liquids is determined by cooling a sample of the oil to be tested in a cooling bath, starting at a temperature higher than the expected cloud point temperature. The sample is taken out of the bath at predetermined moments to ascertain whether a visible separation of paraffin wax and/or other solid substances from the oil has occurred. This determination (which is a standardized method) is a clumsy, time-consuming method which can easily give rise to relatively large subjective failures or misapprehensions. The method is further subject to interference from water and it cannot be applied to dark oils. Moreover, it is not possible to control a process automatically on the basis of such a cloud point determination.

Recently another method for ascertaining the cloud point of an oil has been proposed, according to which the cloud point is determined from the cooling curve (temperature versus time) of the oil sample. This method is based on the theory that at the moment when, during the cooling, paraffin wax starts to crystallize out, the latent heat involved in the crystallization process will retard the cooling of the oil. Thus the cooling curve will show a plateau at the point where the crystallization of the paraffin wax begins, and the temperature corresponding to this plateau is, at least approximately, the cloud point temperature of the oil. Apart from whether this theory is correct or not, the proposed method is still a time-consuming one, which is not, as such, suitable for the automatic control of a process. Accordingly, in order to obtain an automatically operating instrument, the latent heat theory method has been modified by converting it to a differential method wherein the temperature of two samples, one of which is the oil to be tested or test sample and the other of which is a similar reference oil dewaxed beforehand to such an extent that no paraffin wax will crystallize during the cloud point determination, are compared as the samples are simultaneously cooled. The temperature of the test sample at which a difference exists between the two values being compared is then an indication of the cloud point temperature of the test sample. In addition to the fact the modified method has the disadvantage of requiring a dewaxed reference oil, the prime disadvantage of the modified method is that the rate of cooling of the two oil samples as a function of time must be carefully regulated.

The method and the apparatus according to the present invention are based on quite a different phenomenon. No use is made of a cooling curve or of a reference oil sample, and no regulation or control of the rate of cooling is necessary.

According to the present method, the sample of the oil or similar liquid to be tested is cooled in a manner to produce, at least at the start of the cooling procedure, convection currents in the oil. By proper measurements in the oil, the moment is determined at which, as a consequence of the cooling, the convection currents cease to flow, and the temperature of the oil corresponding to this moment is measured as an indication of the cloud point temperature.

The new method is based on the phenomenon that upon cooling a crystal lattice is formed in the oil and that the forming of this lattice impedes convection currents. The temperature at which the lattice structure develops coincides essentially with the temperature at which a visible cloud occurs and is therefore practically identical or at least correlated with the cloud point temperature.

The cessation of the convection currents may be detected in a number of ways, for example, optically, mechanically or acoustically. Preferably, however, the moment in question is determined on the basis of the temperature difference occurring between two separate points in the oil. With respect to the last-mentioned, preferred method of detection, it has been found that the heat transfer mechanism in the oil is predominantly convective at temperatures higher and conductive at temperatures lower than the cloud point temperature (or a temperature near to this temperature) because of the formation of a more or less rigid structure (crystal lattice) at the latter temperature. If the sample is cooled and the two separate points are chosen such that at the start of the cooling procedure convection currents occur between the said points, a cessation of the convection currents will immediately be reflected in the temperature difference between the two points.

According to a further characteristic of the invention, the two points are so chosen (with respect to the particular method of cooling applied) that at the moment the convection currents have ceased, the temperature difference between the two points approaches a constant value (which may be zero) or even better, passes a predetermined value, preferably zero value.

Good results have been obtained by cooling the oil sample entirely or substantially in a lateral direction and measuring the temperature difference between two points spaced in a vertical direction. These results may even be improved by cooling the sample vessel only over part of its height and by measuring between two points which, in so far as their vertical spacing is concerned, are situated asymmetrically with respect to the lateral cooling.

The present method is applicable in any case in which the cloud point of a liquid is of interest. The cloud point of oils, especially mineral oils, is of particular interest, and such oils may include all types of light, medium and heavy hydrocarbon mixtures. Under certain circumstances, the oil to be tested may be diluted with a solvent for the oil, e.g., to reduce its viscosity. Determination of the cloud point for various degrees of dilution and extrapolating the results for zero dilution gives the cloud point of the oil itself.

The temperature and temperature-difference measurements are preferably carried out by means of electrical temperature transducers e.g., resistance thermometers, thermocouples or thermistors, the latter being especially suitable for temperature-difference measurements.

In a practical embodiment of the apparatus according to the invention, the point at which convection currents cease is detected by means of two thermistors which are included in a Wheatstone bridge, with the bridge output voltage being connected to a DC relay stage (preferably a transistorized one), which provides for positive operation of the relay for a small DC change at its input. The bridge circuit and the relay stage are preferably housed in a thermostatted compartment.

A further development of the present method and apparatus makes use of thermo-electro refrigeration of the sample, for example, through use of thermo-electric refrigerators such as Frigistor modules (De La Rue Frigister Ltd.). Usually the modules are arranged in a double layer, the outside layer being water-cooled and the inside layer being in thermal contact with the sample vessel or with a metal block surrounding the said vessel. By reversing the direction of the electric current through the modules, the latter are forced to act as heating elements. The use of the modules as a heater may be desirable in the time interval between two cloud point measurements.

If the apparatus is to be used for controlling a process, e.g., a distillation process, the sample vessel is connected to a fast sample loop of one of the products (e.g. gas oil) of the distillation process. After each measurement the sample cell is flushed out and a new product sample is isolated. The cooling may be stopped during the flushing period and, if necessary, heating may be applied. All of these switching operations may be automatically effected by means of the relay stage discussed above. A signal corresponding to the temperature of the sample measured at the moment when the cloud point is reached (cloud point temperature or correlated temperature) is then fed to a controller, the output signal of which is used to control the process in such a way that the product of the process assumes, at least approximately, a constant cloud point temperature. Alternatively the process may be controlled in such a way as to prevent the cloud point of the product surpassing a certain predetermined limit value.

The temperature the sample assumes in the course of the cooling may, if desired, be displayed on a recorder (saw-tooth diagram), or only the cloud point temperature (peak value of the saw-tooth diagram) may be recorded.

The invention is further illustrated with reference to the 10 drawings wherein.

Figure 1:
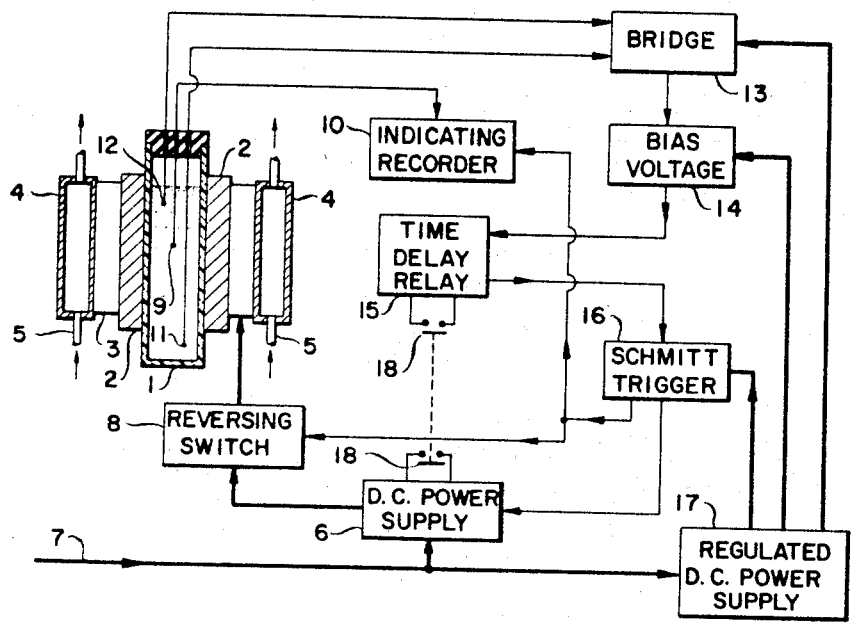
FIGURE 1 is a schematic diagram of a preferred embodiment of the apparatus according to the invention.

Referring now to FIGURE 1, there is shown a preferred embodiment of the apparatus according to the invention for automatically determining the cloud point temperature, or a temperature correlated therewith, of an oil sample. In point of fact the temperature determined by the apparatus does not deviate from the cloud point temperature as determined by the IP (Institute of Petroleum) 15/60 method to any substantial extent. It is always well within the IP limits of reproducibility and nearly always within the IP limits of repeatability; in many cases it does not deviate from the IP value to any appreciable extent at all.

As shown in FIGURE 1, a sample vessel 1 of glass or plastic material containing the oil to be tested is inserted into a metal block 2 in such a way that the bottom protrudes by about 10 mm. The cooling of the oil is effected by means of a thermo-electric refrigerator consisting of a double layer of Frigistor cooling modules 3 on opposite sides of the metal block 2. The modules 3 use the Peltier effect to pump heat from the metal block to a water-cooled heat sink. The heat sink consists of a chamber 4 at the outer side of the modules, which chamber is cooled by a stream of water which enters the chambers via inlet 5. A miniature thermostat (not shown) may be fixed to one or both of the heat sinks in order to protect the cooling modules in the event of cooling water failure; connections may be made to switch off the power supply to the modules if the temperature of the heat sinks exceeds 35° C.

The DC power supply 6 for the modules is connected to the power mains 7 and delivers a direct current to the modules 3 via a reversing switch 8. If the switch 8 is reversed, the current direction is reversed and the modules function as heating elements.

The temperature of the oil sample is measured by means of a temperature responsive electrical transducer such as a thermocouple 9 which is coupled to an indicating and/or recording instrument 10. Instead of a thermocouple, other types of temperature responsive transducers may be used, e.g., a resistance thermometer or a thermistor. The thermocouple 9 is preferably situated in the middle of the vessel at mid-height of the cooling modules 3.

Two temperature responsive resistances or thermistors 11 and 12 are also placed along the axis of the sample vessel, thermistor 11 at a point below the cooling modules 3 and thermistor 12 approximately halfway between thermocouple 9 and the top of the cooling modules.

The thermistors are connected into opposite arms of a Wheatstone bridge circuit 13 for differential temperature measurement. The output voltage of the bridge is connected in series with a biasing E.M.F. 14 and then via a time delay device such as a time delay relay 15 to a DC relay stage 16 which is preferably a transistorized DC relay stage known as a Schmitt trigger. This stage provides for positive operation of the relay for a small DC change at the input. The circuit consists of a transistorized DC amplifier and an emitter follower which operates the relay. The arrangement ensures that the relay is either fully "on" or fully "off." Once triggered, the relay remains in the "on" position until the input drops to just below the "off" potential, when it is triggered to the "off" condition.

The output of the relay stage 16 is utilized to clamp the indicating instrument 10, e.g., by energizing a relay therein, at the moment when the cloud point is reached and to determine the position of the reversing switch 8.

A stabilized power supply 17 connected to the power mains 7 provides the bridge 13, the bias device 14 and the relay stage 16 with the electrical energy required.

The apparatus is put into operation by pushing a button or switch 18 which initiates the delivery by the power supply 6 of current to the thermo-electric refrigeration modules 3 (Frigister Modules) to initiate the cooling cycle of the oil in the vessel 1. Closing the switch 18 simultaneously actuates the time delay device or relay 15 and positions it in the "off" position, whereby the output signal from the bridge 13 is prevented from reaching the Schmitt trigger 16, for reasons to be explained below.

Figure 2:
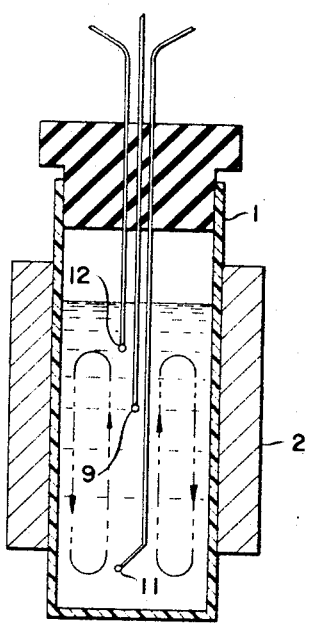
FIGURE 2 is an enlarged view of the sample container of FIGURE 1 illustrating the relationship between the temperature responsive transducers therein and the convection currents formed in the liquid.

When the thermo-electric modules 3 are energized, cooling of the oil sample starts and convection currents develop, as illustrated in FIGURE 2. With the cooling arrangement shown, relatively cold oil will flow down along the walls of the vessel 1 to the lower thermistor 11 whereas warmer oil will rise along the axis of the sample vessel 1 and flow past upper thermistor 12 before restarting its downward motion. Under these conditions, thermistor 12 will be warmer than thermistor 11, and the differential thermal E.M.F. will exhibit a given polarity and a certain (usually varying) value. When the wax precipitation temperature (i.e., the cloud point) has been reached, the convection currents will cease. Thermistor 11 will then no longer receive the cold stream falling from the walls, and thermistor 12 will no longer receive the warmth of the ascending convection stream. On the contrary, thermistor 12 will be cooled by heat conduction into the surrounding metal block 2. As a result of this, the differential thermal E.M.F. is suddenly reduced and actually reverses its polarity. The output voltage of the bridge 13, which is a measure for this differential thermal E.M.F., together with a biasing voltage 14 is fed to input of the Schmitt trigger 16. The reversal of polarity is sensed by the trigger 16, which then clamps the temperature indicator 10 to indicate the temperature of the center thermocouple 9 at the wax precipitation point. Simultaneously the electric current to the thermo-electric modules 3 is reversed, since the trigger device 16 when triggered reverses the condition of switch 8, causing the modules to become a heater.

Subsequently, as the sample warms up, the temperature difference between thermistors 11 and 12 will again become zero, at which point the Schmitt trigger 16 reverts to its original condition and switches off the output power supply 6, thereby deenergizing the modules 3 and terminating the test.

Since at the beginning of the test the temperature difference between thermistors 11 and 12 is zero, the Schmitt trigger 16 would, under normal circumstances, immediately be triggered, and thereby clamp the indicating instrument (which may, e.g., be a galvanometer) and operate switch 8. In order to prevent this unwanted action, the input voltage to the trigger 16 is passed to time delay device 15, which may, for example, consist of a time delay relay having its normally closed contacts connected in series between the output of bridge 13 and Schmitt trigger 16.

When pushbutton 18 at power supply 6 is pressed, the normally closed contacts of relay 15 are simultaneously opened and remain open for a certain time interval, e.g., 45 sec.; thus no input voltage reaches trigger 16 during that interval. The said time interval is so chosen that the temperature difference developed between thermistors 11 and 12 as a consequence of the cooling action of the modules is sufficient to prevent unwanted triggering of the Schmitt trigger at the start of the test.

Tests with a number of different oil samples with cloud points (measured according to IP 15/60 method) in the range from +10° C. to −18° C. showed an excellent correspondence between the cloud point temperature measured according to the standard method and the temperature at which zero temperature difference between 11 and 12 was observed.

Figure 3:
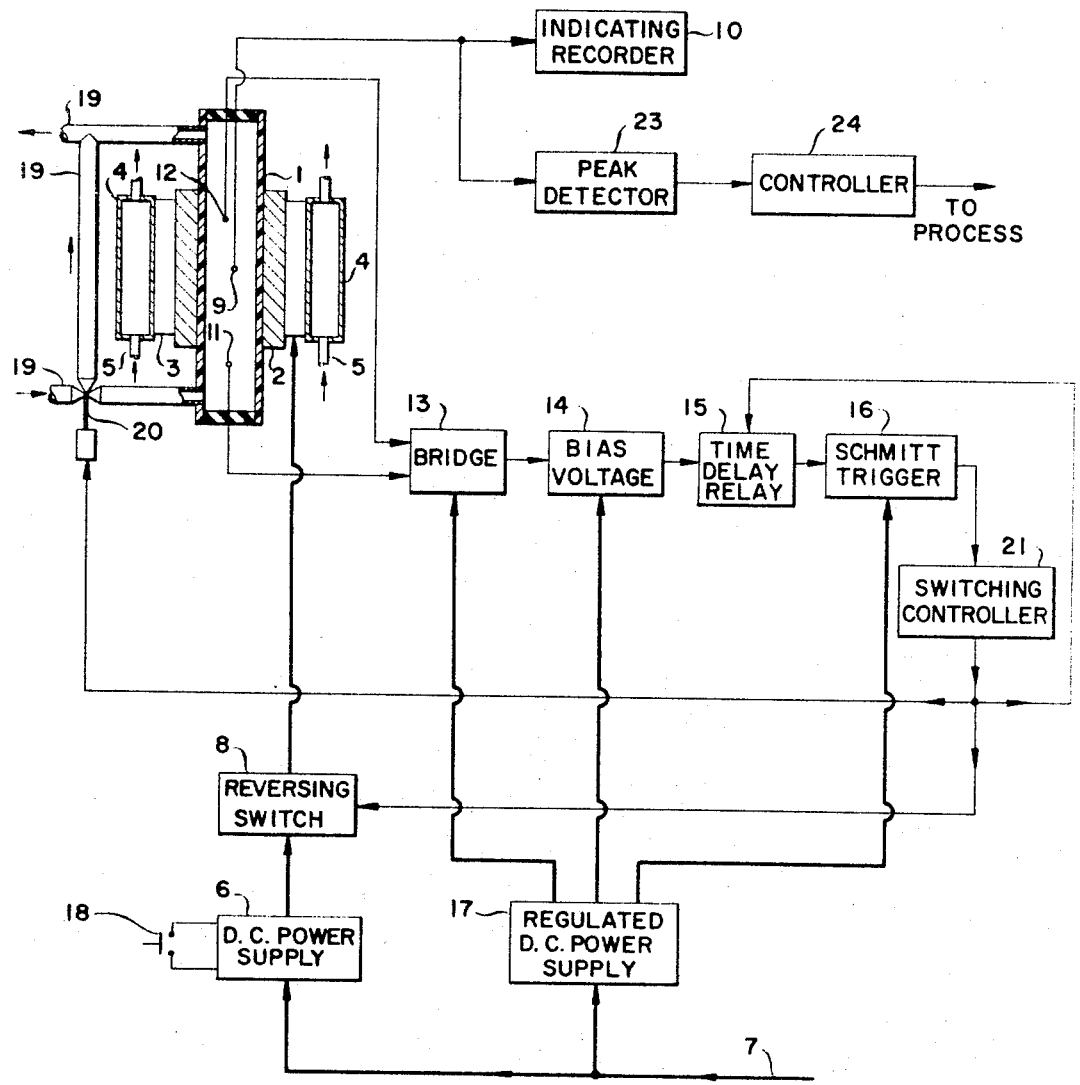
FIGURE 3 is a schematic diagram of a modification of FIGURE 1 for use in semicontinuously determining the cloud point of a process stream and utilizing the result to control the process.

FIGURE 3 shows an apparatus according to the invention which can be used for the semi-continuous recording of the cloud point of a process stream. This apparatus is very similar to the one shown in FIGURE 1, corresponding parts being indicated by the same numbers. The differences between the two apparatuses mainly concern the introduction of the sample and the automatic repetitive operation.

According to this embodiment, a sample stream of the process product to be tested is normally fed through a loop 19 via a solenoid valve 20, thereby by-passing the sample vessel 1. By switching valve 20 from its normal position, the sample stream may be directed through the sample vessel 1 to flush the vessel with the stream under test. This switching is initiated by a switching controller 21 which in turn is controlled by the output signal of the Schmitt trigger 16. The sequence of operation of this embodiment of the invention is outlined below:

(1) The sample vessel 1 is flushed for a fixed period of time (e.g., two minutes) by switching valve 20 from its normal position.

(2) At the end of the flushing period, valve 20 is returned to its original position whereby a sample of the process stream is isolated in the vessel 1 for the performance of the cloud point test.

(3) The sample is then cooled by energizing the thermo-electric modules 3. This cooling is also initiated by switching controller 21 via reversing switch 8.

(4) When the cloud point is reached, the output signal from Schmitt trigger 16 causes the switching controller 21 to switch the solenoid valve 20 to its flushing position for a fixed time interval; reverse switch 8 so as to transform the modules 3 into heating elements; and energize the time delay relay 15 to remove the input signal to the Schmitt trigger 16. The particular time intervals corresponding to these three functions need not have the same length. The cycle of operations is then repeated.

The time required for a complete cycle depends ultimately upon the cloud point of the sample under test, although decreasing the dimensions of the sample vessel and/or increasing the cooling capacity tend to decrease the cycle time.

A record of the sample temperature as displayed by recorder 10 will have a saw-tooth shape from which the cloud point may be easily ascertained. If it is desired to use the cloud point determination to control the process, the recorder 10 may be supplemented by a peak-picking device 23 which produces a signal corresponding to the peak peak-temperature last measured (thus to the last-measured cloud point temperature or temperature related therewith) and a controller 24. The output signal from controller 24 may be used for controlling the process in question so as to ensure a product of constant or substantially constant cloud point temperature or to prevent the product's cloud point surpassing a given limit.

Obviously various modifications of the invention are possible in light of the above teachings without departing from the spirit of the invention. It is therefore to be understood that the invention is not limited to the particular form illustrated, but is capable of embodiment in other forms within the scope of the claims.

We claim as our invention:

1. A method of determining the cloud point temperature of oil comprising:
    cooling a sample of said oil from a temperature substantially above the cloud point temperature to a temperature substantially below the cloud point temperature, whereby free convection currents are induced in said sample;
    measuring the temperature between two spaced points in the sample;
    detecting the point in time at which said measurement of temperature reaches a predetermined value; and
    measuring the corresponding temperature of the oil sample at said point in time.

2. The method according to claim 1 wherein the oil sample is cooled in a substantially lateral direction and the temperature difference is measured between two points which are spaced in a vertical direction.

3. An apparatus for determining the cloud point temperature of oil comprising:
    a sample vessel for holding a sample of the oil to be tested;
    means for measuring the temperature of the oil sample inside said vessel;
    means in thermal contact with the sample vessel for cooling the oil sample in a manner to produce convection currents therein; and
    a pair of temperature responsive means located at different points in said sample vessel to detect the moment at which said convection currents cease to flow, whereby the measured temperature at said moment is an indication of the cloud point of the oil sample.

4. The apparatus of claim 3 wherein said temperature responsive means are as regards their vertical spacing, asymmetrically located with respect to said cooling means.

5. An apparatus for determining the cloud point temperature of oil comprising:
  a sample vessel for holding a sample of the oil to be tested;
  means for measuring the temperature of the oil sample inside said vessel;
  means in thermal contact with the sample vessel for cooling the oil sample in a manner to produce convection currents therein;
  temperature responsive resistors for measuring the temperature of the oil sample inside said vessel;
  a bridge circuit having said temperature responsive resistors connected in opposing arms thereof; and
  a DC relay stage connected to the output of said bridge circuit, said relay stage being actuated by a predetermined output signal from said bridge circuit.

6. The apparatus of claim 5 including a temperature indicator, said temperature indicator being connected to the output of said relay stage and controlled thereby to indicate the temperature of the oil sample whenever said relay stage is actuated.

7. The apparatus of claim 5 including means responsive to the actuation of said relay stage for automatically flushing the oil sample from said sample vessel.

8. The apparatus of claim 7 wherein said means for measuring the temperature of the oil sample inside said vessel comprises a temperature responsive electrical transducer.

9. The apparatus of claim 8 further characterized by:
  a peak detector, said peek detector being connected to the output of said temperature responsive electrical transducer, said peak detector adapted to generate an output signal proportional to the peak of input signal thereto.

References Cited

UNITED STATES PATENTS

| | | | |
|---|---|---|---|
| 2,672,751 | 3/1954 | Lupfer et al. | 73—17 |
| 2,297,641 | 9/1942 | Webber | 73—17 |
| 3,187,557 | 6/1965 | Holbourue | 73—17 |

FOREIGN PATENTS

| | | |
|---|---|---|
| 929,451 | 6/1955 | Germany. |
| 96,982 | 12/1956 | Netherlands. |

JAMES J. GILL, *Primary Examiner.*

ROBERT S. SALZMAN, *Assistant Examiner.*

U.S. Cl. X.R.

73—190